United States Patent
Pross et al.

(10) Patent No.: US 6,239,716 B1
(45) Date of Patent: May 29, 2001

(54) OPTICAL DISPLAY DEVICE AND METHOD OF OPERATING AN OPTICAL DISPLAY DEVICE

(75) Inventors: Gerhard Pross, Weil im Schönbuch; Jens-Peter Seher, Stuttgart; Markus Maile, Boeblingen, all of (DE)

(73) Assignee: Hewlett Packard-Company, Palo Alto, CA (US)

( * ) Notice: Subject to any disclaimer, the term of this patent is extended or adjusted under 35 U.S.C. 154(b) by 0 days.

(21) Appl. No.: 09/335,418

(22) Filed: Jun. 17, 1999

(30) Foreign Application Priority Data

Jun. 25, 1998 (EP) .................................................. 98111708

(51) Int. Cl.[7] ..................................................... G08B 5/00
(52) U.S. Cl. ................................ 340/815.4; 340/815.45; 340/525; 340/321; 362/800; 315/200 A
(58) Field of Search ................................ 340/815.4, 525, 340/815.45, 321; 345/82, 183; 362/800; 315/200 A

(56) References Cited

U.S. PATENT DOCUMENTS

| | | | |
|---|---|---|---|
| 4,271,408 | * 6/1981 | Teshima et al. | 362/800 |
| 4,298,869 | * 11/1981 | Okuno | 362/800 |
| 4,329,625 | * 5/1982 | Nishizawa et al. | 362/800 |
| 4,654,629 | * 3/1987 | Bezos et al. | 362/800 |
| 5,457,450 | * 10/1995 | Deese et al. | 340/912 |
| 5,633,629 | * 5/1997 | Hochstein | 340/907 |
| 5,812,105 | * 9/1998 | Van De Ven | 345/83 |
| 5,936,599 | * 8/1999 | Reymond | 345/82 |

FOREIGN PATENT DOCUMENTS

| | | |
|---|---|---|
| 3911293A1 | 4/1989 | (DE) . |
| 3913877A1 | 4/1989 | (DE) . |
| 4022166A1 | 7/1990 | (DE) . |
| 0726554A1 | 8/1996 | (EP) . |
| 2176042A | 5/1986 | (GB) . |
| 2278717A | 5/1994 | (GB) . |

* cited by examiner

*Primary Examiner*—Donnie L. Crosland

(57) ABSTRACT

An optical display device has a set of LEDs arranged in a matrix and includes control circuitry which acts as a controllable current source and as controllable voltage sources. The control circuitry enables a constant current to be applied for each LED, and respective voltages to be established accordingly. Due to the additional logic circuitry which deliver different clock pulses at different frequencies for cyclic switching of at least one LED, signals that are visible to the human eye are generated and at the same time signals that are not visible to the human eye are also generated. The signals that are not visible are digitally coded and transmitted for appropriately adapted reading devices. Thus additional information for a variety of purposes can be made available, especially in the communications and traffic area, simultaneously with the lighting up of the LEDs. This refers in particular to traffic control systems, diagnosis and monitoring. An optical display device designed in this way permits a design, for example, as a taillight, brake light, flashing indicator light and the like in a motor vehicle or with other traffic and communications means and also in equipment in production facilities while permitting favorable production at the same time due to reduced fault in assembly and ease of adjustment of the light values.

10 Claims, 2 Drawing Sheets example for configuration of 1

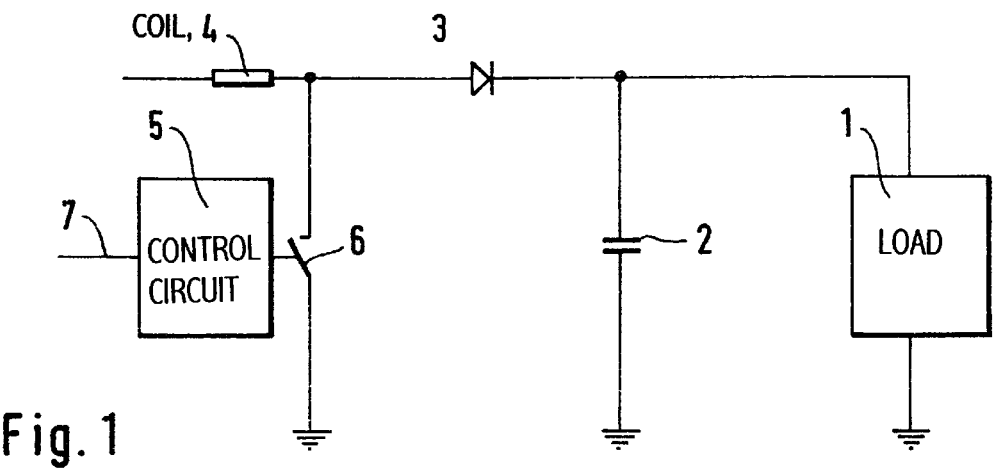
Fig. 1
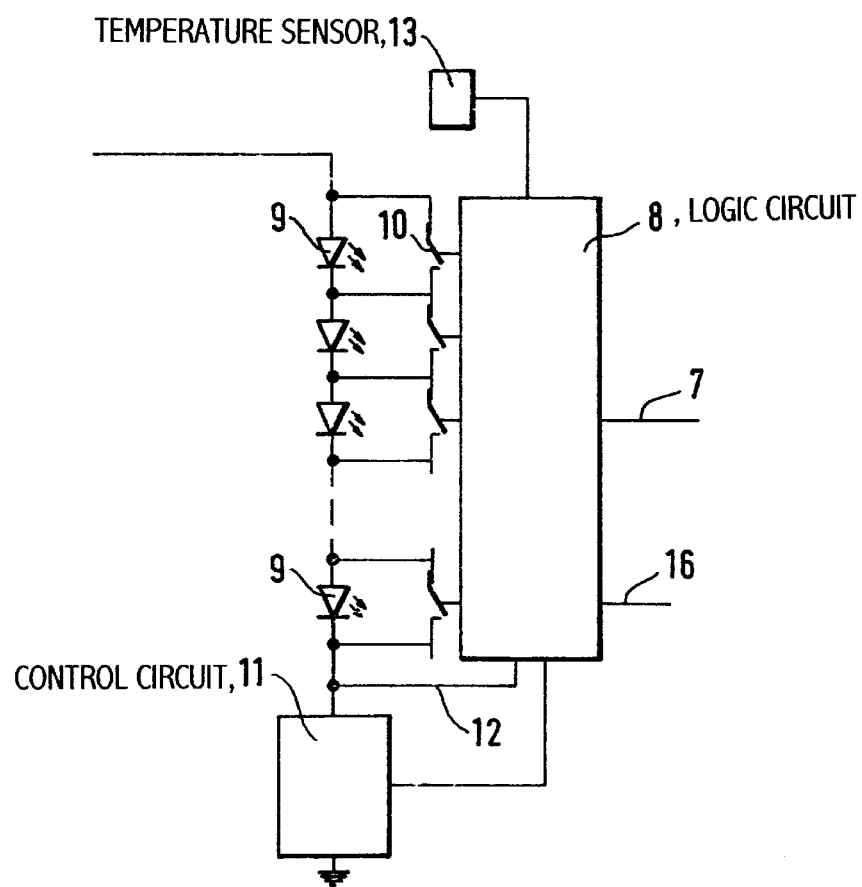
Fig. 2 example for configuration of 1 in figure 1 example for configuration of 1 in figure 3

OPTICAL DISPLAY DEVICE AND METHOD OF OPERATING AN OPTICAL DISPLAY DEVICE

FIELD OF THE INVENTION

The invention relates to an optical display device and a method of operating an optical display device with a set of LEDs connected in series and/or in parallel, where the set of LEDs is connected to control circuit means.

BACKGROUND OF THE INVENTION

Such optical displays are known as the additional third brake light on passenger vehicles, where the LEDs are connected in a parallel connection of n series connections with a maximum of three to four LEDs or as a matrix circuit in a series connection of a maximum of three to four parallel connections of n LEDs of the same forward voltage class. To set the current, the LEDs are provided with series resistors, where the resistance values are selected as a function of the forward voltage class of the respective LEDs.

It would essentially be advantageous to also use LEDs for implementation of the incandescent bulbs used in the past, especially for taillights, brake lights, back-up lights, flashing indicators, etc. on automobiles. Disadvantages of incandescent bulbs include the fact that they have a poor efficiency and a limited lifetime; corresponding colors (wavelengths) must be implemented with additional filters which produce additional losses; incandescent bulbs are bulky and therefore a shallow design adapted to the shape of the vehicle is impossible; due to the limited lifetime, it is necessary to use lamp sockets that permit a simple replacement and thus also take up additional space in the vehicle; incandescent bulbs have a delayed turn-on response, which is manifested especially in braking operations; and brightness control of incandescent bulbs with direct voltage is possible only with loss resistance and thus with corresponding heating.

In comparison with these disadvantages of incandescent bulbs in the automotive area, LEDs have a long lifetime and permit space savings due to the small flat design and the possibility of the three-dimensional arrangement of the lighting elements, for example in the trunk area of a passenger vehicle. Irt addition, different colors are possible since a light spot of any color can be produced with a mixture of red, green and blue LEDs, or LEDs with different colors Due to the possibility of rapid turn on, they present an increased safety aspect especially when used as a brake light, lengthening the stopping distance for the following automobile by approximately five meters when traveling at a speed of 120 km/hr, for example, because it is possible to detect the leading car's braking action sooner. In addition, LEDs have a high shock resistance and vibration resistance as well as a lower inherent temperature. The power required to produce the same brightness is lower by a factor of 4 to 5.

Nevertheless, in implementation of LEDs, especially for brake lights and taillights, with the possible implementations available in the past there has been a high power consumption, which is converted almost completely into heat at resistors and semiconductor components (typically 3 to 5 watts). This evolution of heat in conjunction with temperatures occurring in the vehicle can lead to an unacceptably high chip temperature of more than 125° C. under conventional installation conditions. Therefore, to prevent additional heat problems with the LED brake lights known in the past, the number of LEDs per light is preferably selected as an integral multiple of 3 or 4. The arrangement of resistors and/or semiconductor components on the LED circuitboard represents an additional thermal stress for the LEDs. Another problem for mass production of such lights is the different forward voltage classes of the LEDs because a mixed assembly is impossible especially with the above-mentioned matrix circuit with a series connection of a maximum of 3 to 4 parallel connections of n LEDs in the same forward voltage class. Consequently, several different forward voltage classes must be processed for each light project, which leads to an undesirable variety of variants. With the series resistors used in the past, the working point of the LEDs can be set only for one voltage value of the on-board voltage in the vehicle, so that the wide distribution of the forward voltages of an LED within one class always leads to a blurred setting of the working point in the case of a resistance circuit. Super positioning of several tolerances (reflector quality, geometric tolerances, band width of the brightness classes resistance tolerances, band width of the forward voltage classes, transmittance of the light disk and the optically effective elements) can lead on the whole to a wide scattering of the light values in mass production.

Essentially, it is possible to use LEDs for signal lights not only in the automotive area but also in all means of communication or in production shops with moving units or other warning devices. In contrast to bulbs, LEDs can be switched very fast (nsec). It is also frequently necessary to relay information, especially with all means of communication, but also in production shops. For example, it might be necessary to transmit all possible information about the vehicle and/or the mount in the workshop, at the gas station, in traffic control systems, in for parking fees, toll roads, vehicle inspections, borders, etc. with regard to automation by appropriately controlled computer systems. Invisible data transmission can also be used to control air traffic at airport runways, for example, or to direct aircraft to their proper parking positions. However, invisible transmission by means of infrared, for example, has the disadvantage that a malfunction such that the transmission link is interrupted cannot be detected without additional measurement equipment.

Therefore, the object of the present invention is to propose an optical display device and a method of operating an optical display device with which information can be transmitted visibly and invisibly at the same time.

SUMMARY OF THE INVENTION

This object is achieved by means of an optical display device having the features of the recited claims. Additional advantageous embodiments are given in the subclaims which refer back to the respective main claims in this regard.

According to this invention, the set of LEDs has a matrix of LEDs, where the matrix consists at least of one column of at least one, with the LEDs in the column connected in series and the columns connected in parallel. Each column of the LED matrix is connected to first control circuit means which act as a controllable current source, and the set of LEDs is connected to second control circuit means which act as a voltage source for adjusting the voltage across the LEDs as a function of the current set This arrangement results in constant current operation in each column, i.e., in each LED branch, so this eliminates the division of different classes of forward voltages, and. different forward voltage classes can be arranged in one branch. Therefore, this reduces the variety of variants in assembly as well as the danger of faulty assembly. The constant current yields an accurate working setting of the LEDs. Since no resistors are necessary to adjust the individual LEDs, this. eliminates the corresponding production of heat at the resistors. The number of LEDs can be selected freely, i.e., no gradation in multiples of 3 or 4 is necessary. On the whole, this yields a lower total power consumption by the system.

The column given in the definition of the matrix is one LED or a series connection of several LEDs in each column. Several columns or branches can be connected in parallel. In this connection, the term row or series could also be used instead of the term column for the arrangement of LEDs (depending on the angle of observation).

The first control circuit means have a corresponding number of current sources, depending on the number of LEDs and the arrangement either all in rows or with several columns connected in parallel with LEDs connected in series. By means of the controllable current sources, the desired brightness can be set by setting the current. The second control circuit means, controlled by the first control circuit means, automatically set the proper voltage needed, depending on the circuit arrangement and the current set. Thus, the voltage must be adjusted upward by the second control circuit means in comparison with the voltage supplied by the wiring system when using only one column with a plurality of LEDs in series, whereas the voltage is reduced with an arrangement of several parallel columns with a few LEDs. In addition, the combination of upwards and downwards conversion is possible.

To achieve a minimal power consumption, the lowest possible voltage required for proper functioning of the LEDs is set by means of the second control circuit means.

The logic circuit means in the first control circuit means deliver different clock pulses with different frequencies for switching at least one LED and thus generate signals and communication that are visible to the human eye and at the same time also generate invisible signals. This allows the transmission of digital information to suitable receivers which control other units, for example, on the basis of the transmitted signals when the LEDs deliver a signal that is visible to the human eye. Due to simultaneous transmission of information, it is possible to ascertain easily whether the transmission path is disturbed. Switching the individual LEDs with clock pulses thus permits a variety of applications.

According to a preferred embodiment, the control circuit means contain logic circuit means; programming and setting of the constant current sources takes place over these logic circuit means. The voltage in the second control circuit means is set for example by a dc—dc converter with pulse width modulation (PWM).

In the event of failure of one or more LEDs, either the entire display may fail, depending on the arrangement, or further operation may be allowed, assuming corresponding brightness values. According to another embodiment, the logic circuit means deliver a signal in either case, providing an indication that a replacement is necessary or compensation is possible.

Especially for production of the complete optical displays, it is necessary in the final inspection to compensate for manufacturing tolerances and to set different brightness classes at the same light value. For this reason the first control circuit means have connection means with which it is possible to set the current flowing through the LED externally. Since practical implementation is in the form of an integrated circuit, it has an additional input terminal for this purpose, for example.

In another embodiment a temperature sensor which is arranged in proximity to the LEDs is connected to the logic circuit means and delivers a corresponding temperature signal to it, so that the LED current can be set by the logic circuit means as a function of the temperature.

According to another embodiment; the logic circuit means switch the LEDs on and off in a cycle with a frequency that is invisible to the human eye to adjust the brightness in day and night operation and to turn a tail light into a stop light and vice versa. This measure provides a uniform load on the LEDDs with regard to their lifetime.

The LEDs for one light point may preferably consist of three LEDs in different colors of red, green and blue and the logic circuit means drive them according to the desired color. Thus all colors for the lights can be implemented and additional color filters are unnecessary.

The first and second circuit means and the logic circuit means may be arranged either in the area of the lights, in the plug connector to the respective light or in the area of central control electronics.

BRIEF DESCRIPTION OF THE DRAWINGS

The invention is explained in greater detail below in conjunction with the figures, which show:

FIG. 1 the basic circuit arrangement for a load with LEDs connected only in series;

FIG. 2 the circuit arrangement for the load in FIG. 1;

DETAILED DESCRIPTION OF THE INVENTION

Figure 3:
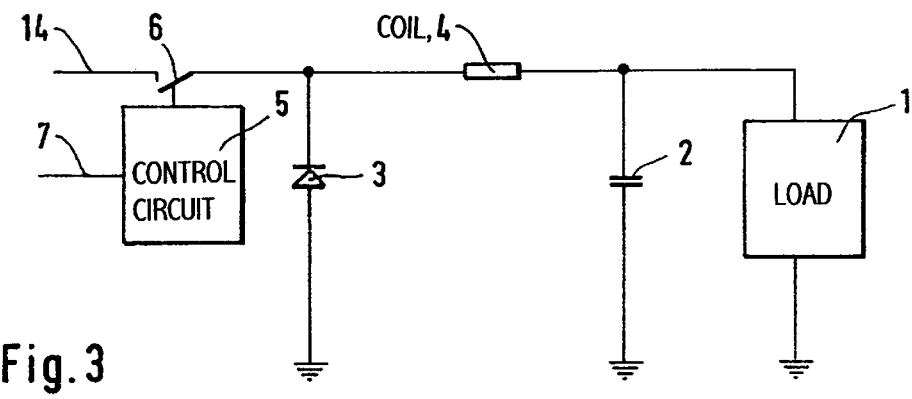
FIG. 3 the basic circuit arrangement for a load with several parallel connected column arrangements of LEDs.

The basic circuit shown in FIG. 1 shows the arrangement of a parallel connection of load 1 and capacitor 2. This parallel connection is itself connected to the signal triggering source, e.g., at a central location (not shown) by way of a series connection of diode 3 and coil 4. A control circuit 5 is connected between coil 4 and diode 3 and is connected in parallel to diode 3, capacitor 2 and load 1. Control circuit 5 sets the voltage required for operation of load 1 by pulse width modulation by means of switch 6 Control circuit 5 is connected by line 7 to logic circuit 8 shown in FIG. 2.

FIG. 2 shows the structure of load 1 from FIG. 1 with a plurality of series connected LEDs 9. For example, the known high-performance LEDs can be used as LEDs. Essentially, however, it is also possible for three LEDs with the colors red, green and blue together to form one light point and produce the desired color for the light by appropriate triggering. As FIG. 2 shows, each LED can be short-circuited over a switch 10, so that in the event of a failure of one LED, the other LEDs may continue to operate by short-circuiting the corresponding LED by means of logic circuit 8, or dimming of the LEDs can be performed by short-cutting the LEDs by means of circular variation. Another control circuit 11 which is connected to logic circuit 8 is connected in series with LEDs 9. Logic circuit 8 is also connected by line 12 to the input of control circuit 11. A constant current through the LEDs is set as current adjust by means of logic circuit 8 via control circuit 11, regardless of how many LEDs 9 are in operation. No separate current source is necessary because control circuit 5 sets the voltage for only one branch of series connected LEDs 9 as representative of all series connected LEDs 9 as a function of control circuit 11 and the set current. In this embodiment, the voltage across all the LEDs must be adjusted upward to 60 volts, for example, in comparison with a lower on-board voltage of 12 volts or 20 volts, for example, due to the series connection of the LEDs. Logic circuit 8 is also connected to a temperature sensor 13 to be able to regulate the current by means of control circuit 11 as a function of the temperature.

In the basic circuit according to FIG. 3, the same elements are labeled with the same reference numbers. In comparison with the basic circuit according to FIG. 1, coil 4 is connected here in series with the parallel connection of capacitor 2 and load 1 because of the modified design of the load. Diode 3 is arranged parallel to this series connection in the blocking direction. Just as in the previous example, the voltage on the load is set on the basis of the current with control circuit 5 and the respective switch 6 which is operated by pulse width modulation in signal line 14.

Figure 4:
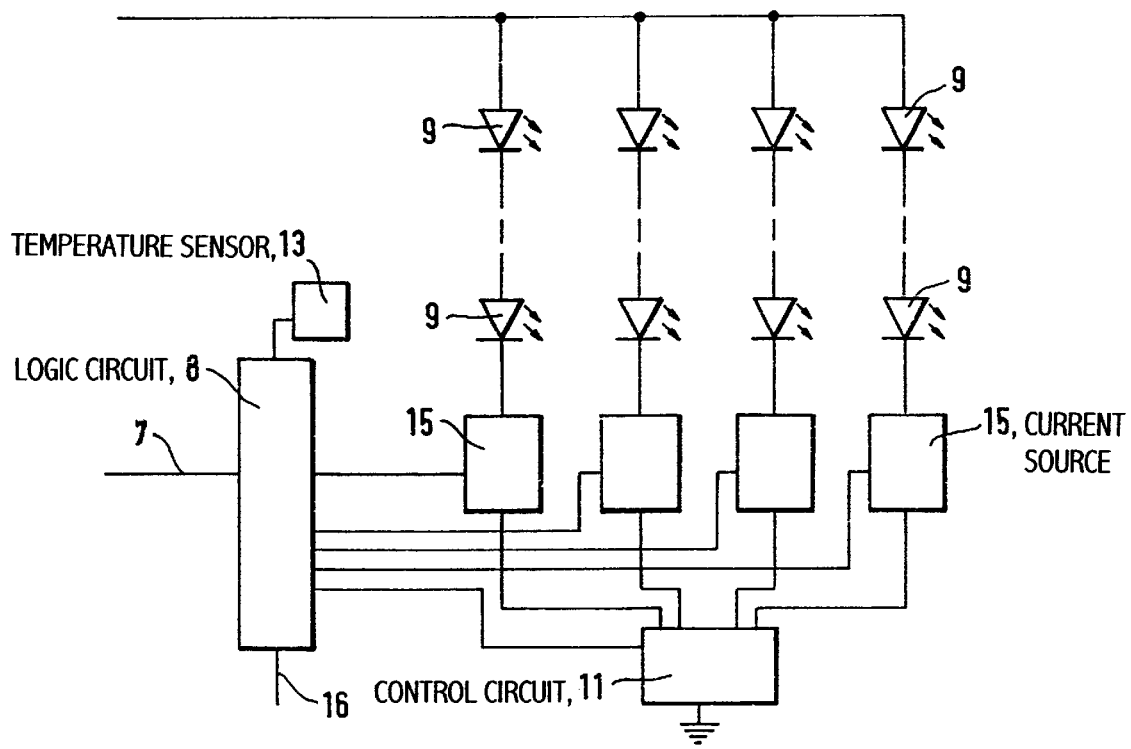
FIG. 4 the circuit arrangement for the load according to the basic circuit in FIG. 3.

FIG. 4 shows the design of the load and shows several parallel connected columns of LEDs 9 connected in series, where each series connection is assigned to a current source which is connected to a logic circuit 8. Logic circuit 8 is connected to control circuit 5 over line 7. A constant current in each branch is guaranteed by means of current sources 15 because of the parallel connection of the individual LED branches 9, so the constant currents are applied by means of current sources 15 which are connected to control circuit 11. In the embodiment according to FIGS. 3 and 4, control circuit 5 is set at a lower voltage, e.g., 8.5 volt, than the on-board vehicle network due to the parallel connection of individual LED columns. In both embodiments, the current required for the desired brightness is set and programmed after manufacture of the arrangement, taking into account the manufacturing tolerances. The respective voltage is then established as a function of the applied current, where control circuit 5 is always set at the lowest required voltage for optimum operation of the LEDs.

Terminal 16 on logic circuit means 8 is used for external setting and programming of the desired and required constant currents, e.g., at the end of the band, to compensate for production tolerances or for setting identical light values in different brightness classes of LEDs 9. Failure of individual LEDs 9 can be reported to a central location over an additional line (not shown).

On the example of the circuit according to FIG. 2, the functioning of the data transmission is explained in greater detail below. On the basis of the turn-on times of the LEDs which are in the nanosecond range, it is possible by means of logic circuit means 8 and the respective switches 10 to switch the individual LEDs with a frequency of >100 kHz. These interruptions are not visible for the human eye, but they can be detected by appropriate receiving systems. This makes it possible to relay digitized information invisibly. This can be used, for example, in diagnosis of a means of communication in the workshop, in automated refueling at the tank station, in determining parking fees, toll fees, vehicle inspections and the like, in traffic control systems or in other transmission of vehicle information, for example, or in production shops. Since the LEDs 9 deliver visible light simultaneously with the transmission, it is possible to ascertain immediately when there is trouble on the transmission path. There are numerous possible applications of this design for data transmission, where an optical display in the form of a flashing light or a continuous light is necessary anyway, and additional information is necessary in particular for controlling a moving device or a means of communication. In cyclic switching and in setting the light values as a function of the ambient brightness, the switching on and off of the LEDs is distributed as uniformly as possible over all LEDs or by cyclic reversal to ensure a uniform load on all LEDs and to impair the lifetime of the LEDs as little as possible. With all these measures, the current through the LEDs remains constant because of control circuit means 11. A corresponding operation is also possible for the circuit according to FIG. 4.

Operation as a flashing light is possible by cyclic switching of switch 10 at a frequency of <25 Hz.

What is claimed is:

1. An optical display device with a set of LEDs which are connected in series or in parallel, said optical display device comprising:
   a set of LEDs comprising a matrix, said matrix comprising at least one column of at least one LED, with the LEDs in each column being connected in series and the columns being connected in parallel,
   first control circuit means which are connected to at least each column and act as a controllable current source to set a constant current through the corresponding column(s),
   logic circuit means for delivering different clock pulses with different frequencies to the first control circuit means for cyclic switching of at least one LED to generate signals that are visible to the human eye and at the same time signals that are not visible to the human eye, and
   second control circuit means connected to the matrix and the first control circuit means, for acting as a controllable voltage source to adjust the voltage across the LEDs as a function of the current injected.

2. An optical display device according to claim 1, wherein for minimal power consumption, the second control circuit means set the lowest possible voltage required for proper functioning of the LEDs.

3. An optical display device according to claim 1, wherein each LED can be short-circuited by a switch.

4. An optical display device according to claim 1, wherein the logic circuit means deliver a signal when there is a failure of one or more LEDs.

5. An optical display device according to claim 1, wherein the logic circuit means switch the LEDs cyclically at a frequency that visible to the human eye to set the brightness in day and night operation.

6. An optical display device according to claim 1, wherein the logic circuit means cyclically switch the LEDs in a digitally coded manner to transmit information to a corresponding receiver.

7. An optical display device according to claim 1, wherein the LEDs for a light point comprise three LEDs in different colors, namely red, green and blue, and the logic circuit means drive them according to a desired color.

8. A method of operating an optical display device with a set of LEDs arranged in series or in parallel, said method comprising the steps of:

setting a constant current through said LEDs;

cyclically switching said LEDs by a logic control means at a frequency that is not visible to the human eye and at the same time delivering an optical signal visible to the human eye, and emitting coded digital signals for suitable adapted reading devices; and controlling the voltage across the LEDs as a function of the current infected.

9. A method according to claim 8, wherein when several LEDs are connected in series, a faulty LED is bridged when there is a failure in one or more LEDs, and the current is kept constant in the series.

10. A method according to claim 8, wherein luminous power of the LEDs is varied to adapt it to ambient brightness by cyclically switching the LEDs on and off.

* * * * *

UNITED STATES PATENT AND TRADEMARK OFFICE
CERTIFICATE OF CORRECTION

PATENT NO.   : 6,239,716 B1
DATED        : May 29, 2001
INVENTOR(S)  : Gerhard Pross, Jens-Peter Seher, and Markus Maile Page 1 of 1

It is certified that error appears in the above-identified patent and that said Letters Patent is hereby corrected as shown below:

<u>Column 7, claim 8,</u>
Line 8, please change "infected" to -- injected --.

Signed and Sealed this

Fifteenth Day of January, 2002

Attest:

Attesting Officer

JAMES E. ROGAN
*Director of the United States Patent and Trademark Office*